May 2, 1933.  O. C. NATLIS  1,906,279
GLASS CUTTING MACHINE
Filed Feb. 9, 1932  2 Sheets-Sheet 2
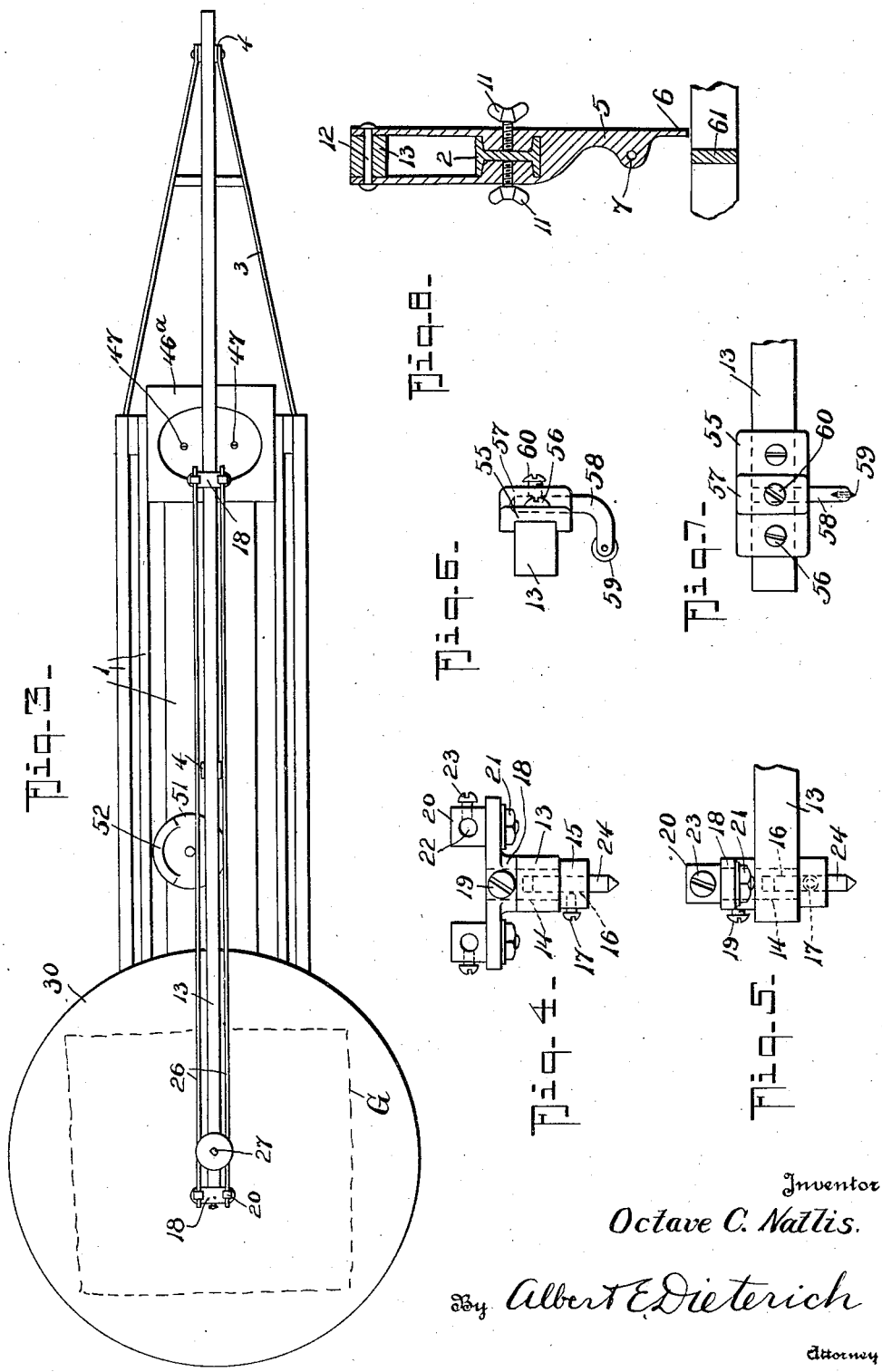
Inventor
Octave C. Natlis.
By Albert E. Dieterich
Attorney Patented May 2, 1933

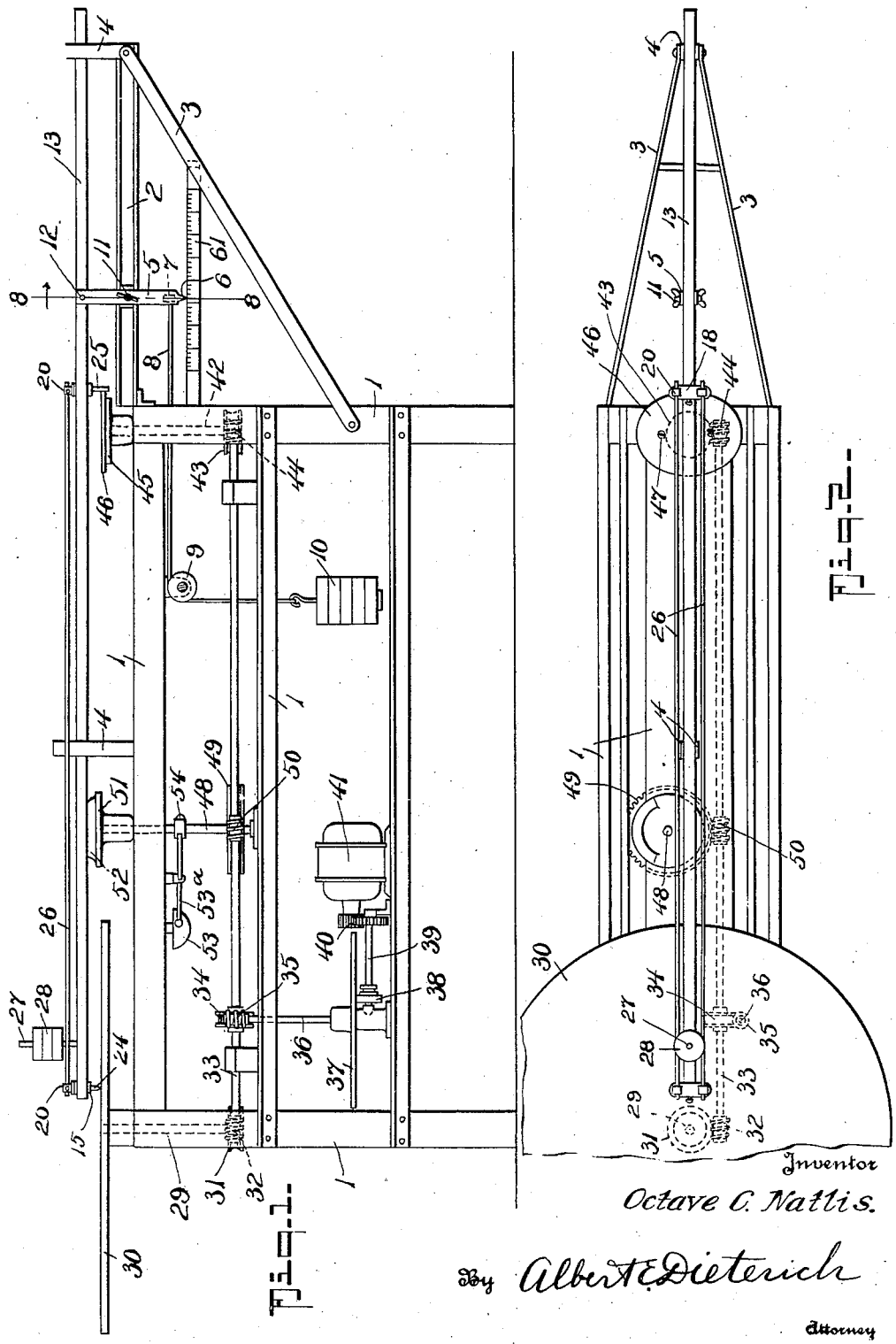

1,906,279

UNITED STATES PATENT OFFICE

OCTAVE CHARLES NATLIS, OF CHARLESTON, WEST VIRGINIA, ASSIGNOR TO LIBBEY-OWENS-FORD GLASS COMPANY, OF TOLEDO, OHIO, A CORPORATION OF OHIO

GLASS CUTTING MACHINE

Application filed February 9, 1932. Serial No. 591,897.

My invention relates to a certain new and improved machine for cutting glass, and particularly for cutting out from glass plates forms of various sizes or contours.

At present it is the practice to use a straight edge, a pattern or male or female template (depending on the type glass to be cut) lay the same on the glass and apply a glass cutting implement to the glass while guiding it in contact with the pattern, etc. as the glass cutter is moved by hand. This method is open to several objections, among which may be mentioned the fact that the pattern must usually be held to the glass to be cut by one hand while the operator moves the glass cutter with the other hand; when so manipulated the pattern sometimes slips or becomes misplaced and the work spoiled, also equal pressure on the cutting implement cannot be given throughout its path of travel when it is moved by hand with the result that the cut is deeper at some places than at others and in separating the waste from the cut section a rough break-away occurs, leaving the edge of the cut-out section more or less ragged. My invention, therefore, has for one of its objects to provide a machine which will overcome the objectionable features of the hand method above referred to.

Further, it is an object of the invention to provide a machine whereby glass forms of irregular and varying outlines may be cut as easily as those of circular outlines and wherein provision is made to cut circular sections without the necessity of using a template, pattern or other guiding form, if desired.

Another object of the invention is to provide a machine in which change from one template to another may be made quickly and easily by simply changing two bolts or screws.

It is a further object of the invention to provide a machine that can be operated by a boy or girl and does not require the employment of skilled workmen.

Another object of the invention is to provide a machine in which the cutting implement may be either a diamond point or a cutting wheel.

Other objects will in part be obvious and in part be pointed out hereinafter.

To the attainment of the aforesaid objects and ends, the invention still further resides in the novel details of construction, combination and arrangement of parts, all of which will be first fully described in the following detailed description, then be particularly pointed out in the appended claims, reference being had to the accompanying drawings, in which:—

Figure 1 is a side elevation of my machine employing a male template.

Figure 2 is a plan view of the same, parts being broken away.

Figure 3 is a plan view, the machine being provided with a female template.

Figure 4 is an enlarged detail front elevation of the cutter bar and parts carried thereby.

Figure 5 is a side elevation of the parts shown in Figure 4.

Figure 6 is a detail end elevation, similar to Figure 4, showing a modified construction.

Figure 7 is a side elevation of the parts shown in Figure 6.

Figure 8 is an enlarged detail cross section on the line 8—8 of Figure 1.

In the drawings in which like numerals of reference indicate like parts in all of the figures, 1 represents the frame of the machine, from the rear of which extends a channel or I-beam member 2 that is suitably braced at 3 to be rigid. Extending upwardly from the frame 1 and from the rear end of the beam 2 are parallel guide posts 4 between which the cutter bar 13 lies.

5 is a sliding fulcrum post which remains in a vertical position but is slidable back and forth along the beam 2. This post 5 may be clamped in any position along the beam 2 by means of suitable set screws 11. However, when the machine is being used with patterns, templates or the like, the set screws 11 are loosened and the fulcrum post 5 is moved forwardly by means of a cable 8 attached to the eye 7 of the post 5, the cable passing over a pulley 9 and carrying a variable weight 10. The post 5 is provided with a pointer 6 to cooperate with the scale bar 61 that is rigidly mounted and is graduated in lineal measurements as inches and fractions thereof for example, giving the distance of the cutting point 24 from the center of the work holding turntable 30 for puposes hereinafter explained. The cutter bar 13 is fulcrumed at 12 on the sliding fulcrum post 5 and, as before stated, lies between the pairs of vertical guides 4 so that it may be rocked in a vertical plane but have no substantial lateral movement.

The cutter bar 13 has holes 14 one at the front end and one near the fulcrum, in which holes 14 are sleeves 15 having sockets 16 for the cutter tool 24 and the guide pin 25 respectively. The members 24 and 25 are held in the sockets of the sleeves 15 by suitable set screws 17 and are adjustable in height in the sockets.

18 designates cross heads fitted on the upwardly extending ends of the sleeves 15 and held thereto by set screws 19, thus securing the cross heads and sleeves to the cutter bar. Each cross head 18 has lateral projecting portions on which are mounted blocks 20 having apertures 22 paralleling the cutter bar in which the rods 26 are held by means of suitable set screws 23. The blocks are held in place by threaded shanks and nuts 21 that pass through the lateral extensions of the cross heads 18. The blocks 20 are preferably swivelled upon the lateral extensions of the cross head 18 so that, upon longitudinal adjustment of the rods 26, the said cross head can be turned slightly so as to turn the sleeve 15 carrying the cutting tool 24 whereby to adjust and center the diamond.

27 is a vertical post near the front end of the cutter bar on which variable weights 28 may be placed to hold the cutting tool 24 in engagement with a plate of glass G located on the turntable 30, see Figure 3.

The work turntable 30 is mounted on a vertical shaft 29 journalled in suitable bearings in the frame 1 and carrying a worm gear 31 that meshes with the worm 32 on a worm shaft 33, the worm shaft 33 being driven by means of a gear 34 on it meshing with a worm 35 on another vertical shaft which is journalled in suitable bearings in the frame 1 and carries the major disk 37 of a variable friction drive, the minor driving disk 38 of which is shiftable along but turns with the driving shaft 39 that is operated from a motor 41 through suitable gearing 40. By shifting 38 along the shaft 39 from or toward the rotational center of the disk 37 the speed of the shaft 36 may be varied without changing the motor speed.

42 is the pattern turntable shaft which is also journalled vertically in suitable bearings in the frame 1, it being understood that the shafts 29 and 42 are arranged in parallel and in alignment with the cutter bar. The shaft 42 has a driving gear 43 meshing with a worm 44 on the shaft 33. The worms 32 and 44 are alike and the gears 31 and 43 are of the same diameter so that rotation of the shaft 33 imparts rotation to each of the shafts 29 and 42 at the same speed.

The shaft 42 carries the pattern turntable 45 on which the pattern or template 46 (male) or 46a (female) is secured by suitable screws or bolts 47.

48 is the cutter bar lifting shaft which is journalled in vertical position in suitable bearings in the frame 1 and carries a driven gear 49 of twice the diameter of the gear 31 or the gear 43 so that when motion is imparted to it by the worm 50 on the shaft 33 the turntables 30 and 35 will each make two revolutions to one revolution of the shaft 48. The shaft 48 carries the cam disk 51 for the cutter bar lifter cam 52 which operates under the cutter bar and lifts it every other revolution of the turntable 30. For each revolution of the shaft 48 a suitable alarm is operated. This alarm may consist of a bell 53 and striker 53a operated by a suitable trip 54 on the shaft 48.

In Figures 6 and 7 is shown a modification and when this modification is used the rods 26 are omitted and the members 18 and 15 at the front of the cutter bar are also omitted. In lieu of the latter members a block 55 is secured to the side of the bar 13 at the front by suitable screws 56 and this block has a socket 57 for the right-angled arm 58 that carries the glass cutting wheel 59, the latter being located beneath the bar 13 as shown in Figure 6. The arm 58 is held rigidly in the socket 57 by a suitable set screw 60.

In using my invention when it is desired to cut glass according to a given form, the form, pattern, or template is secured to the pattern turntable 45 and the sheet of glass from which the article is to be cut is laid on the turntable 30. (If desired the surface of the turntable 30 may be rubber-covered or otherwise provided with a substance that will hold the glass against slipping.) It should be understood that the glass is placed on the turntable 30 while the cutter bar 13 is in the raised position with the glass cutter 24 clear of the table. The pattern being secured to the turntable 45, the pin 25 is held in engagement with the pattern by the weight 10 acting through cable 8. It is, of course, understood that the set screws 11 are loose at this time. As the motor drives the machine the cam 52 will ride out from under the bar 13 and the cutter 24 will be brought into engagement with the glass G. It is held in pressure contact by means of suitable weights 28. The turntables 30 and 45 now make somewhat more than a complete revolution, after which the cam 52 rides under the bar 13 and raises the cutter 24, permitting the attendant to remove the glass sheet and place another in position during the second revolution of the turntable 30.

If it be desired to cut circular disks the use of a template or pattern is unnecessary. In that event the guide pin 25 is either removed or forced up out of the way in its socket and the sliding fulcrum post 5 is clamped tight to the beam 2 at a suitable position, depending on the diameter of the circle to be cut, which diameter is determined by the graduations of the scale 61.

If it be desired to use the wheel glass cutter instead of the diamond point, the arrangement shown in Figures 6 and 7 is employed. Otherwise, the operation is substantially the same as before.

From the foregoing description, taken in connection with the accompanying drawings, it is thought the complete construction, operation and advantages of my invention will be clear to those skilled in the art to which it appertains.

What I claim is:

1. In glass cutting machines, a support, a work turntable mounted thereon, a cutter bar, means mounting said cutter bar on said support for movement lengthwise toward and from the center of the turntable, a glass cutting implement carried by said bar, means pivoting said bar on said mounting means to rise and fall over said turntable, means tending to hold said bar with its cutter end down on the turntable, means to lift said bar from said turntable at intervals, a motor, and power transmitting connections between said motor and said turntable and said lifting means.

2. In glass cutting machines, a support, a work turntable mounted thereon, a cutter bar, means mounting said cutter bar on said support for movement lengthwise toward and from the center of the turntable, a glass cutting implement carried by said bar, means pivoting said bar on said mounting means to rise and fall over said turntable, means tending to hold said bar with its cutter end down on the turntable, means to lift said bar from said turntable at intervals, a motor, and power transmitting connections between said motor and said turntable and said lifting means, a pattern turntable driven in step with said work turntable by said power transmitting means, a guide pin carried by said cutter bar to engage a pattern on said pattern turntable.

3. In glass cutting machines, a support, a work turntable mounted thereon, a cutter bar, means mounting said cutter bar on said support for movement lengthwise toward and from the center of the turntable, a glass cutting implement carried by said bar, means pivoting said bar on said mounting means to rise and fall over said turntable, means tending to hold said bar with its cutter end down on the turntable, means to lift said bar from said turntable at intervals, a motor, and power transmitting connections between said motor and said turntable and said lifting means, a pattern turntable driven in step with said work turntable by said power transmitting means, a guide pin carried by said cutter bar to engage a pattern on said pattern turntable, and means continuously tending to hold said guide pin in working contact with the pattern.

4. In glass cutting machines, a support, a work turntable mounted thereon, a cutter bar, means mounting said cutter bar on said support for movement lengthwise toward and from the center of the turntable, a glass cutting implement carried by said bar, means pivoting said bar on said mounting means to rise and fall over said turntable, means tending to hold said bar with its cutter end down on the turntable, means to lift said bar from said turntable at intervals, a motor, and power transmitting connections between said motor and said turntable and said lifting means, a pattern turntable driven in step with said work turntable by said power transmitting means, a guide pin carried by said cutter bar to engage a pattern on said pattern turntable, and means to hold said cutter bar mounting means in any of a series of positions at dierent distances from the center of said work turntable.

5. In glass cutting machines, a support, a work turntable mounted thereon, a cutter bar, means mounting said cutter bar on said support for movement lengthwise toward and from the center of the turntable, a glass cutting implement carried by said bar, means pivoting said bar on said mounting means to rise and fall over said turntable, means tending to hold said bar with its cutter end down on the turntable, means to lift said bar from said turntable at intervals, a motor, and power transmitting connections including a speed changing means between said motor and said turntable and said lifting means, a pattern turntable driven in step with said work turntable by said power transmitting means, a guide pin carried by said cutter bar to engage a pattern on said pattern turntable, and means continuously tending to hold said guide pin in working contact with the pattern, and means to hold said cutter bar mounting means in any of a series of positions at different distances from the center of said work turntable.

6. In glass cutting machines, a support, a work turntable mounted thereon, a cutter bar, means mounting said cutter bar on said support for movement lengthwise toward and from the center of the turntable, a glass cutting implement carried by said bar, means pivoting said bar on said mounting means to rise and fall over said turntable, means tending to hold said bar with its cutter end down on the turntable, means to lift said bar from said turntable at intervals, a motor, and power transmitting connections between said motor and said turntable and said lifting means, said bar mounting means comprising a slideway fixed to the frame, and a sliding fulcrum post on said slideway.

7. In glass cutting machines, a support, a work turntable mounted thereon, a cutter bar, means mounting said cutter bar on said support for movement lengthwise toward and from the center of the turntable, a glass cutting implement carried by said bar, means pivoting said bar on said mounting means to rise and fall over said turntable, means tending to hold said bar with its cutter end down on the turntable, means to lift said bar from said turntable at intervals, a motor, and power transmitting connections between said motor and said turntable and said lifting means, a pattern turntable driven in step with said work turntable by said power transmitting means, a guide pin carried by said cutter bar to engage a pattern on said pattern turntable, said bar mounting means comprising a slideway fixed to the frame and a sliding fulcrum post on said slideway.

8. In glass cutting machines, a support, a work turntable mounted thereon, a cutter bar, means mounting said cutter bar on said support for movement lengthwise toward and from the center of the turntable, a glass cutting implement carried by said bar, means pivoting said bar on said mounting means to rise and fall over said turntable, means tending to hold said bar with its cutter end down on the turntable, a motor, and power transmitting connections between said motor and said turntable.

9. In glass cutting machines, a support, a work turntable mounted thereon, a cutter bar, means mounting said cutter bar on said support for movement lengthwise toward and from the center of the turntable, a glass cutting implement carried by said bar, means pivoting said bar on said mounting means to rise and fall over said turntable, means tending to hold said bar with its cutter end down on the turntable, a motor, and power transmitting connections between said motor and said turntable, a pattern turntable driven in step with said work turntable by said power transmitting means, and means carried by said cutter bar to engage a pattern on said turntable.

10. In glass cutting machines, a support, a work turntable mounted thereon, a cutter bar, means mounting said cutter bar on said support for movement lengthwise toward and from the center of the turntable, a glass cutting implement carried by said bar, means pivoting said bar on said mounting means to rise and fall over said turntable, means tending to hold said bar with its cutter end down on the turntable, a motor and power transmitting connections between said motor and said turntable, a pattern turntable driven in step with said work turntable by said power transmitting means, means carried by said cutter bar to engage a pattern on said pattern turntable, and means to hold said cutter bar mounting means in any of a series of positions at different distances from the center of said work turntable.

OCTAVE CHARLES NATLIS.